United States Patent [19]

Chabert et al.

[11] 3,985,718

[45] Oct. 12, 1976

[54] POLYMERIZATION OF OLEFINIC MONOMERS USING A FOUR COMPONENT INITIATOR

[75] Inventors: Henri Chabert; Robert Chapurlat, both of Lyon; Claude Gigou, Versaison; Michel Ruaud, Villeneuve par Ternay, all of France

[73] Assignee: Rhone-Poulenc S.A., Paris, France

[22] Filed: Aug. 5, 1974

[21] Appl. No.: 495,106

Related U.S. Application Data

[60] Division of Ser. No. 354,152, April 24, 1973, abandoned, which is a continuation of Ser. No. 794,358, Jan. 27, 1969, abandoned.

[52] U.S. Cl. .............................. 526/113; 526/91; 526/93; 526/94; 526/117; 526/118; 526/135; 526/145; 526/146; 526/147; 526/192; 526/193; 526/208; 526/209; 526/210; 526/213; 526/217; 526/220; 526/225; 526/226; 526/227; 526/229; 526/236

[51] Int. Cl.$^2$.......................... C08F 2/16; C08F 4/40

[58] Field of Search ........ 260/92.8 W, 91.7, 94.9 C, 260/93.7, 88.2 B, 87.1, 87.3, 87.5 C, 87.7

[56] References Cited
UNITED STATES PATENTS 3,860,568   1/1975   Chabert et al. ................ 260/92.8 R Primary Examiner—Alan Holler
Attorney, Agent, or Firm—Cushman, Darby & Cushman

[57] ABSTRACT

Four component polymerization initiators for olefinic monomers comprise (1) an oxidizing agent such as hydrogen peroxide, a persulphate, a permanganate, a chlorate, a perchlorate, a bichromate, a bromate, a ceric salt, an oxazirane, an organic peroxide or an organic hydroperoxide, (2) a chelate compound of a metal such as titanium, iron, vanadium, aluminum, tin, manganese, chromium, cobalt, copper, zinc or bismuth in which the metal is not fully coordinated, (3) an electron donor in amount at most equal to that required to complex completely the said metal of the chelate compound, the said electron donor being for example an amine, a monoalcohol, an ether, an aldehyde, a ketone, an imine, an oxime, an amide, a sulphonamide, or a phosphonamide, and (4) a chelate complex or salt which is different from the chelate compound (2) and in which the metal may be for example, copper, iron, magnesium, manganese, chromium, vanadium or tin, the degree of coordination of the said metal being different from that of the metal in the chelate compound component. (2).

5 Claims, No Drawings

POLYMERIZATION OF OLEFINIC MONOMERS USING A FOUR COMPONENT INITIATOR

This is a division of application Ser. No. 354,152 filed Apr. 24, 1973, now abandoned; which in turn is a continuation of Ser. No. 794,358 filed Jan. 27, 1969, now abandoned.

This invention relates to the polymerization of olefinic monomers, and to polymerization initiators for use in such polymerization.

In our United States Application Ser. No. 63,999, filed June 19, 1970, now U.S. 3,860,568, which is a continuation of our Application Ser. No. 637,356, filed May 10, 1967, now abandoned, for "Novel Polymerization Initiator And Process For Polymerization Using The Same", we have described and claimed an initiator, useful for polymerizing olefinic monomers at from −30° to 100° C., which comprises:

(1) an oxidizing agent; (2) a chelate compound of a metal of Group IB, IIB, IVB, VB, VIB, VIIB, IIIA, IVA, VA and VIII of the Periodic Table with an at least bidentate ligand, in which compound the metal is still capable of accepting one or more electron pairs from an electron donor, and (3) an electron donor (different from the said ligand) in amount at most equal to that required to complex completely the metal of the chelate compound.

The aforesaid three components of the initiators of the said application are, in more detail, as follows:

1. Oxidising Agents

Suitable oxidising agents for use in the initiators include: inorganic oxidising agents such as hydrogen peroxide, persulphates, permanganates, chlorates, perchlorates, bichromates, bromates and ceric ($Ce^{++++}$) salts; and organic oxidising agents such as oxaziranes (e.g. 2-butyl-3-isopropyl-oxazirane), and organic peroxides and hydroperoxides, including, more particularly, the acyl peroxides, for example, acetyl, benzoyl, lauroyl, terephthaloyl, and acetyl-lauroyl peroxides, the alkyl cycloalkyl, and aryl peroxides, for example, t-butyl, lauryl, t-butyl-lauryl, cyclohexyl and cumyl peroxides, and the hydroperoxides, for example cyclohexyl and cumyl hydroperoxide.

2. Chelate Compounds

The chelate compounds used in the initiators have a central metallic atom which still possesses the ability to accept at least one electron doublet from an electron donor atom, i.e. the degree of co-ordination of the central metallic atom is lower than the maximum degree of co-ordination of this atom.

The co-ordination number of a metallic acceptor atom represents the number of atoms directly attached to this central atom in a complex. With some metals in a high degree of oxidation, this co-ordination number is fixed and is characteristic of the metal, without the co-ordination number and the degree of oxidation being the same; while with other metals the co-ordination number may have various different values for a given degree of oxidation. In some cases, a correlation may exist between the co-ordination number and the degree of oxidation, while in other cases the co-ordination number is the same regardless of the degree of oxidation. The co-ordination number sometimes depends upon the nature of the donor atom.

The chelates employed in the initiators may be represented by the general formula:

$$X_n[MQ_s(D_pA)_m] \qquad \text{I}$$

in which M represents a metal atom of group IB, IIB, IVB, VB, VIB, VIIB, IIIA, IVA, VA or VIII of the Periodic Table (see, e.g. Handbook of Chemistry and Physics, 45th Edition, p. B.2), preferably titanium, iron, vanadium, aluminium, tin, manganese, chromium, cobalt, copper, zinc, or bismuth; D represents an electron-doublet donor group such as one of these defined by Dwyer and Mellor in "Chelating Agents and Metal Chelates", 1964, pp. 17 and 18; A is an organic residue carrying the groups D and consisting of a hydrocarbon chain optionally substituted by groups which are not electron-doublet donors, or of a substituted or unsubstituted, aliphatic or aromatic, cyclic or polycyclic, hydrocarbon residue, or of both of a hydrocarbon chain and a cyclic residue; X represents either an anion, such as a halide, sulphate or nitrate anion, or a cation, such as an alkali metal (e.g. $Na^+$, $K^+$, or $Li^+$), ammonium or quaternary ammonium cation; Q represents an oxygen or sulphur atom or an organic radical such as a lower alkyl, cycloalkyl, aryl, lower alkoxy, cycloalkoxy or aryloxy radical; $p$ is an integer equal to or higher than 2, which represents the number of donor groups in the ligand of formula $D_pA$; $s$ is nought or an integer, and $m$ is an integer equal to or higher than 1, $s$ and $m$ being such that $(pm + s)$ has a value lower than the maximum co-ordination number of the metal M; and $n$ is nought (in the case of non-ionisable chelates) or an integer or an improper fraction (in the case of ionisable chelates) corresponding to the number of electrical charges of the grouping $[MQ_s(D_pA)_m]$, which is then a chelate ion.

Although chelates in which the ligand of formula $D_pA$ is tri-, quadri- or quinque-dentate may be employed in the initiators, it is preferable to employ chelates in which the ligand or ligands are bidentate. A list of such ligands is given by Dwyer and Mellor loc. cit., pp. 95–132. Suitable such bidentate ligands include: diacids such as oxalic acid, malonic acid or 1-carboxyphenyl-acetic acid; hydroxy acids such as glycollic acid, lactic acid and salicyclic acid; o-diphenols such as catechol; hydroxyaldehydes such as o-hydroxybenzaldehyde (salicylaldehyde); hydroxy ketones such as o-hydroxyacetophenone; diols such as ethylene glycol; diamines such as ethylene diamine, 1,3-diamino-propane, o-phenylene-diamine, 1-phenyl-ethylene-1,2-diamine; bis-heterocyclic compounds such as 2,2'-bipyridyl and 1,10-phenanthroline; amino acids such as glycine, anthranilic acid, $\alpha$- and $\beta$-aminobutyric acids, 2-pyrrolidine-carboxylic acid (proline), 1-amino-cyclopentane-carboxylic acid; aminophenols such as o-aminophenol; hydroxylated heterocyclic compounds such as 8-hydroxy-quinoline; hydroxyaldimines such as N-phenyl-o-hydroxy-benzaldimine; thioalcohols such as 2-mercapto-ethanol; and thioacids such as thioglycollic acid. A preferred class of bidentate ligands consists of the $\beta$-dicarbonyl compounds of the general formula:

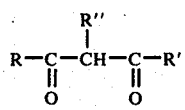
II in which R represents a hydrogen atom or a substituted or unsubstituted hydrocarbon radical, or an alkoxy radical, R' represents a substituted or unsubstituted hydrocarbon radical, it being possible for R and R' to be identical when they both represent hydrocarbon radicals, R'' represents a substituted or unsubstituted hydrocarbon radical, or a hydrogen or chlorine atom. More specifically, the hydrocarbon radicals which may be represented by R and R' include alkyl radicals, such as methyl, ethyl, propyl, butyl and octyl, cycloalkyl radicals, such as cyclopentyl and cyclohexyl, aryl radicals, such as phenyl and naphthyl, aralkyl radicals such as benzyl, substituted alkyl radicals such as trifluoromethyl, alkoxyalkyl radicals such as ethoxymethyl; and substituted aryl radicals such as o-methoxyphenyl, 2,3-dichlorophenyl and 4-hydroxyphenyl.

The alkoxy radicals which may be represented by R include more particularly methoxy, ethoxy, propoxy and butoxy. The hydrocarbon radicals which may be represented by R'' include more particularly lower alkyl radicals such as methyl, ethyl, propyl and butyl.

Two of the symbols R, R' and R'' may also represent in combination a divalent hydrocarbon chain (for example polymethylene), the rings which they then form with the remainder of the molecule then containing 5 or 6 carbon atoms.

The dicarbonyl compound of formula II may also be a bicyclic compound in which the group

is common to both rings.

Examples of the compounds of formula II are: diketones such as acetylacetone (2,4-pentanedione), 2,4-hexanedione, 2,4-heptanedione, 5-methyl-2,4-hexanedione, 2,4-octanedione, 3-methoxy-2,4-pentanedione, 3,5-heptanedione, 1,1,1-trifluoro-2,4-pentanedione, benzoylacetone, dibenzoylmethane, o-methoxybenzoylacetone, 1,1,1-trifluoro-2-benzoylacetone, β-naphthoyl-trifluoroacetone, 3-methyl-2,4-pentanedione, 3-butyl-2,4-pentanedione, 1,3-cyclopentanedione, 1,3-cyclohexanedione, 5,5-dimethyl-1,3-cyclohexanedione (dimedone), 2-acetylcyclohexanone, 1,8-hexahydronaphthalenedione, and 1-hydroxybenzoylacetone; β-ketoaldehydes such as propionylacetaldehyde, benzoylacetaldehyde, and α-formylcyclohexanone; esters of α-keto-acids such as methyl, ethyl and butyl acetoacetate, and methyl benzoylacetate.

Examples of bidentate chelate compounds which may be used in the invention are: ferrous acetylacetonate, vanadyl acetylacetonate, vanadyl methylacetylacetonate, vanadyl 2-acetylcyclohexanate, vanadyl heptanedionate, vanadyl propionylacetaldehydate, vanadyl benzoylacetaldehydate, dichlorotitanium acetylacetonate, diethyl-tin acetylacetonate, cupric acetylacetonate, vanadyl salicylaldehydate, vanadyl-bis-(acetylacetamide), vanadyl-bis(acetylacetanilide), vanadyl thioglycollate, vanadyl anthranilate, ethoxyaluminium acetylacetonate, and vanadyl α-formylcyclohexanoate.

Examples of tridentate ligands are 2,6-bis(α-pyridyl)-pyridine and 2-(α-pyridylmethyleneaminomethyl)pyridine, and, of tetradentate ligands, bis-benzoylacetonepropylenediimine.

3. Electron Donors

Generally speaking, the electron donor must be a unidentate ligand producing co-ordination by a σ electron doublet. However, if, because of its degree of co-ordination in the chelate compound (2), the metal can only accept one further electron doublet, this new doublet may be supplied by a ligand comprising two or more doublet-donor groups. Generally speaking, the electron donor compound may comprise as the donor group one of those mentioned for the ligands of the chelate compound. Thus, it is possible to employ monoamines such as methylamine, ethylamine, n-butylamine, cyclohexylamine, or diphenylamine; monoalcohols such as methanol, ethanol, propanol, butanol, cyclohexanol or benzyl alcohol; ethers such as dimethyl ether, diethyl ether, dibutyl ether, methyl cyclohexyl ether, methyl phenyl ether, dioxan, and tetrahydrofuran; aldehydes such as formaldehyde, acetaldehyde or benzaldehyde; imines such as acetaldimine; hydroxylamine and its derivatives, such as cyclohexyloxime or benzaldoxime; ketones such as acetone, or methyl ethyl ketone; amides such as acetamide, propionamide, formamide or urea; or sulphur derivatives such as sulphonamides or phosphorus derivatives such as hexamethylphosphotriamide.

Although any compound comprising a doublet-donor atom may be employed, the best results are obtained with compounds whose reducing character is least pronounced, unlike what happens with the previously known ternary redox systems mentioned above. Thus, for a given monomer, the polymer yield is higher with primary amines than with tertiary amines.

As already mentioned the chelate compound (2) and the electron donor (3) may be separately added to the polymerisation initiator to form a complex in situ, or this chelate/donor complex may be preformed and introduced as such into the initiator combination.

The initiator is suitable for the polymerisation of olefinic monomers comprising at least one olefinic double bond, and more especially of monomers in which the olefinic double bond is in the α,β-position to an activating grouping. The various monomers which may be polymerised may be represented by the formula:

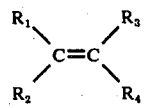   III in which $R_1$, $R_2$, $R_3$ and $R_4$ each represent a hydrogen atom, a halogen atoms, a functional grouping, or a substituted or unsubstituted hydrocarbon radical. More particularly, $R_1$, $R_2$, $R_3$ and $R_4$ may be chlorine, bromine or fluorine atoms or alkyl, cycloalkyl or aryl radicals, or heterocyclic radicals, or alkoxy, carboxy, alkoxycarbonyl, aryloxycarbonyl, carbamoyl, nitrile, acyl, alkylthio, alkylsulphonyl, arylsulphonyl, aldehyde, alkylcarbonyloxy or arylcarbonyloxy groups.

Suitable monomers include: vinyl chloride, vinylidene chloride, vinyl and allyl esters such as vinyl acetate, propionate and benzoate; acrylic and methacrylic acids and their derivatives such as alkyl acrylates, acrylamide, acrylonitrile, and ethylene-glycol diacrylates; vinyl ketones such as 3-butene-2-one; vinyl ethers such as vinyl ethyl ether; unsaturated aldehydes such as acrolein; vinyl sulphones such as vinylphenylsulphone; heterocyclic compounds substituted by a vinyl group such as vinylpyridines and vinylpyrrolidones; vinyl thioethers such as vinyl ethyl sulphide; and purely hydrocarbon compounds as divinylbenzene and ethylene.

These compounds may be homopolymerised or copolymerised with one another or with copolymerisable resins such as unsaturated polyesters.

The initiating system may be employed in all modes of polymerisation: in bulk, in solution, in emulsion or in suspension. It is particularly suitable for this last mode of polymerisation, in which use must be made of oil-soluble initiators. In this case, the oxidising agent is preferably an organic peroxide or hydroperoxide, the chelate compound, a chelate of a β-dicarbonyl compound, and the electron donor a compound which is only partially soluble in the monomer.

The temperature at which the polymerisation is carried out may vary from −30° to +100° C, depending upon the initiating system and the monomer employed. Because of their high activity, the initiating systems make it possible to carry out polymerisations at elevated temperature, i.e. at temperatures above 30° C, employing only extremely small quantities of initiator. It is thus possible to obtain polymers comprising very few initiator residues, and this constitutes an important advantage of the new system over previously known systems. At low temperatures, the initiators show an activity which is not shared by any of the various constituents taken individually or in pairs.

The quantities of oxidising agent and chelate compound may vary within fairly wide limits. In general, they may be used, in each case, in a molar proportion of 0.0005 to 5% based on the monomer, although molar proportions from 0.0005 to 0.1% are generally sufficient. In addition, the molar proportion of chelate compound may generally be lower than the molar proportion of oxidising agent. The quantity of electron donor employed must be, as already stated, at most equal to that which the metal of the chelate is still capable of complexing. When the polymerisation in question is a bulk polymerisation with an electron donor which is soluble in the monomer, or a solution polymerisation in an organic solvent, or a polymerisation in a heterogeneous medium with an electron donor which is soluble only in the monomer, the quantity of electron donor to be added to the reaction medium is at most equal to that which the metal of the chelate is still capable of complexing. On the other hand, in the case of a polymerisation in a heterogeneous medium with an electron donor which is partially soluble in the phase which does not contain the monomer, the quantity of electron donor to be added may be greater than that which the metal of the chelate is still capable of complexing, so that, taking into account the partition coefficient between the phases, the initiating system present in the phase containing the monomer satisfies the aforesaid condition. In all cases, the quantity of electron donor to be actually added may be readily determined by a simple preliminary test, the polymerisation reaction being inhibited when the quantity of electron donor present in the monomer is greater than that which the metal of the chelate present in this same monomer can complex.

Polymerisations using the new initiators may be carried out in the presence of the usual polymerisation adjuvants; e.g. emulsifiers, suspending agents, and anti-gels (in the case of low-temperature polymerisation). When the electron donor is alkaline, as is the case with ammonia and the amines, it is preferable, if the monomer is likely to undergo an alkaline hydrolysis, to carry out the operation in the presence of a buffer such as, for example, sodium bicarbonate.

In the case of solution polymerisation, the same organic solvents may be employed as in known processes. However, when the solvent employed is an electron donor (e.g. an alcohol or amide such as dimethylformamide), it is necessary to choose as electron donor in the initiating system a compound which gives with the chelate compound employed a complex which is more stable than that formed with the solvent, i.e. the donor chosen must be able to displace the solvent from the complex which the latter may have formed with the chelate compound. However, it is preferable to employ a solvent which is not an electron donor, e.g. a saturated hydrocarbon such as hexane, heptane or cyclohexane.

The initiators afford many advantages over previously known catalytic systems. In the first place, they make it possible to carry out polymerisation at low temperature employing as oxidising agents substances which, like lauroyl and benzoyl peroxides, are stable at ambient temperature, while the initiating systems used in earlier low temperature polymerisation processes necessitate the use of compounds which must decompose at sufficient speed at low temperature to initiate the polymerisation, and which consequently exhibit at ambient temperature an instability such that they are capable of causing explosions.

Another advantage of the initiators resides in the possibility which they afford, because they involve the use of compounds which are soluble in the monomer, of performing low temperature polymerisation by the suspension polymerisation process. Suspension polymerisation in water of vinyl monomers such as vinyl chloride and vinyl acetate affords many advantages over emulsion polymerisation: the polymer is readily recoverable by filtration; in addition, the suspending agents employed for the suspension polymerisation (such as, for example, polyvinyl alcohol or polyvinylpyrrolidone) have the advantage that they may be eliminated by washing the polymer in water, or that they may optionally be left in the polymer without any major disadvantage, while on the other hand the emulsifiers employed in emulsion polymerisation are difficult to eliminate and often catalyse the degradation of the polymer.

In the case of the polymerisation of vinyl chloride, the initiators also make it possible, without employing low temperatures, but simply operating at a temperature of 10°–20° C, to obtain polymers which have thermomechanical properties (elongation, transition point, and Vicat point) similar to those of polymers obtained at lower temperatures with other initiating systems. In addition, a comparative study of the infra-red spectra shows that the polyvinyl chloride thus obtained has substantially the same structure as the polyvinyl chloride obtained by earlier processes at lower temperatures. The tacticity of polyvinyl chloride is assessed by the ratio D of the optical densities of the bands at 1428 $cm^{-1}$ and at 1434 $cm^{-1}$ of the infra-red spectrum of the polymer [see Germar, Makrom. Chem. 60, 106, (1963); and Takeda Polym. Sci., 57, 383 (1962)]. This ratio increases with the tacticity of the polymer. Vinyl chloride polymers prepared at a temperature of 10°–20° C with the initiators have a ratio D similar to the ratio D of polymers obtained at temperatures below 0° C with other initiators which indicates a similar tacticity in agreement with the similarity of the thermomechanical properties.

The initiators also make it possible to polymerise α-olefines including more particularly ethylene, at low pressure. By "low pressure" is meant pressures between 1 and 100 bars absolute. Previously, the polymerisation of ethylene with free radical-type catalysts involved the use of temperatures of 250° C or more and pressures of at least 300 bars, generally 1,000 bars or more.

It has now been found that the aforesaid initiators can be improved by including therein (4) a chelate, complex, or organic or inorganic salt of a metal of Groups IB, IIB, IVB, VB, VIB, VIIB, IIA, IIIA, IVA, VA and VIII of the Periodic Table, in which the degree of coordination of the metal is different from the degree of coordination of the metal in the said chelate compound (2).

By this improved initiator the degree of conversion of the olefinic monomer or monomers employed in the polymerization is increased to a considerable extent. The amount of the metal derivative (4) thus additionally added is generally from $10^{-6}$ to $10^{-3}$, preferably $10^{-5}$ to $10^{-4}$, molecules per molecule of monomer. This amount corresponds approximately to a value of between 1/10 and 1/100 of the amount of the chelate compound (2).

As the additional metal derivative (4) it is possible to use any chelate of a metal of the Groups indicated above regardless of the degree of coordination of the central metallic atom. That is to say that in addition to the chelate compound (2) it is possible to use other chelates in which the central metal atom has its maximum degree of coordination. Amongst these latter chelates there may more specifically be mentioned: ferric, manganic or chromic acetylacetonates, or vanadic benzolyacetaldehydate. The surprising nature of the present invention should be noted in this context, because systems containing components using totally coordinated chelates are totally inactive in initiating polymerization, as was demonstrated for ferric acetylacetonate in Example 2 of our aforesaid Application.

The additional metal derivative (4) may also consist of a complex of an organic or inorganic coordination compound with an above-mentioned metal in which the central metallic atom may have any degree of oxidation and of coordination. When organic coordination compounds are used, these may be chosen from those with: monoamines such as methylamine, n-butylamine and cyclohexylamine; monoalcohols such as ethanol, butanol, cyclohexanol and benzyl alcohol; ethers such as methyl ether, ethyl ether, methyl cyclohexyl ether, methyl phenyl ether, dioxane and tetrahydrofuran; aldehydes such as formaldehyde, acetaldehyde and benzaldehyde; imines such as acetaldimine; hydroxylamine and its derivatives such as cyclohexanone-oxime and benzaldoxime; ketones such as acetone and methyl ethyl ketone; amides such as acetamide, propionamide, formamide and urea; sulphur derivatives such as the sulphamides; phosphorus derivatives such as tris(dialkylamino)phosphine oxides; and cyclic dienes such as cyclopentadiene or cyclooctadiene. Amongst the inorganic coordination compounds which can be used, there may be mentioned the $CN^-$, $SCN^-$, halide, $NO_2^-$ and $OH^-$ ions and water, ammonia, nitric oxide and carbonmonoxide.

It is also possible to use in the present invention a metallic derivative (4) consisting of an organic or inorganic salt of a metal of the Groups defined above in which the metal has any degree of oxidation. In this context there may be mentioned the copper and iron salts of saturated or unsaturated aliphatic acids and of cycloaliphatic or aromatic acids, the halides, nitrates and sulphates of copper or iron, chromium chloride, nitrate, sulphate and perchlorate, magnesium sulphate and chloride and stannic chloride.

The use of the modified initiator system of the present invention is effected in the same manner as that described in our above-mentioned patent application, the contents of which are incorporated herein for detailed description of the composition of the first three components of the initiator, and the use of the initiator in polymerizing olefins. The polymers obtained are of indentical quality to those obtained with the initiators of the said earlier Application but the degree of conversion of the monomers employed is better with the present invention.

The Examples given below illustrate the invention.

EXAMPLE 1

Various experiments on the polymerisation of vinyl chloride are carried out, using the following procedure in each experiment. 0.5 g. of lauroyl peroxide, 0.330 g. of vanadyl acetylacetonate, a metallic derivative of which the nature and amounts are indicated in the Table below, a solution of 0.5 g. of hydroxymethylcellulose in 400 cm³ of water which has been freed of oxygen by bubbling nitrogen through it, and 100 g. of vinyl chloride are introduced into a glass autoclave of 1 liter capacity provided with a stirrer and placed under an atmosphere of nitrogen. Stirring is started, the temperature is stabilised at 16° C, and 2 cm³ of ammonia (density 0.9) are then injected. After 18 hours reaction, the gas is released from the reaction mixture to remove the excess vinyl chloride, and the polymer is then filtered off and dried at 50° C under a reduced pressure of 100 mm of mercury.

By way of comparison, an experiment is also carried out without the additional metallic derivative. The various results obtained are collected in the Table below.

| Nature of the additional metallic derivative | Amount in g. | Degree of conversion of the vinyl chloride |
|---|---|---|
| Comparison experiment | 0 | 30 % |
| Cupric acetylacetonate | 0.005 | 76 % |
| Cupric acetylacetonate | 0.020 | 92 % |
| Ferric acetylacetonate | 0.010 | 79 % |
| Cupric chloride | 0.013 | 70 % |
| Ferric chloride | 0.012 | 90 % |
| Potassium ferricyanide | 0.025 | 70 % |

EXAMPLE 2

600 cm³ of cyclohexane, 3 g. of lauroyl peroxide, 1.98 g. of vanadyl acetylacetonate, 0.25 g. of ferric acetylacetonate and 1.65 cm³ of cyclohexylamine contained in a sealed glass ampoule are introduced into a stainless steel autoclave of 1 liter capacity provided with a stirrer and placed under an atmosphere of nitrogen, the sealed glass ampoule being so located that it breaks when the stirring is started. Ethylene is then injected to a pressure of 45 bars, stirring is started, and the temperature is kept at 15° C. After 20 hours, the gas is released from the reaction mixture to remove the excess ethylene, and the mixture is filtered and the polymer precipitated by adding 500 cm³ of methanol.

After filtering off the polymer and drying at 50° C under a reduced pressure of 100 mm of mercury, 33 g. of polyethylene are obtained.

The same experiment carried out without ferric acetylacetonate leads to only 20 g. of polyethylene being obtained.

EXAMPLE 3

The procedure of Example 2 is followed, replacing the ferric acetylacetonate by 0.1 g of magnesium acetylacetonate. 33 g. of polyethylene are obtained.

EXAMPLE 4

The procedure of Example 2 is followed, replacing the vanadyl acetylacetonate by 4.05 g of vanadyl lauroylacetonate and the ferric acetylacetonate by the same amount of chromium acetylacetonate. 45 g. of polyethylene are obtained.

The same experiment carried out without chromium acetylacetonate only gives 30 g. of polyethylene.

We claim:

1. In a process for the polymerization of an olefinic monomer selected from the group consisting of a vinyl chloride, a vinylidene chloride, ethylene, propylene, a mixture of said monomers, and a mixture of said monomer with a vinyl ester which comprises contacting said monomer, at a temperature from −30° to +100° C, with a polymerization initiator consisting essentially of a combination of (1) an oxidizing agent selected from the group consisting of hydrogen peroxide, persulphates, permanganates, chlorates, perchlorates, bichromates, bromates, ceric salts, oxaziranes, and organic peroxides and hydroperoxides, (2) a chelate compound of a metal in which compound the metal is still capable of accepting one or more electron pairs from an electron donor, the said chelate compound having the formula:

$$X_n[MQ_t(D_pA)_m]$$

in which X represents an anion or a cation; $n$ is zero, in the case of non-ionizable chelates, or an integer or an improper fraction, in the case of ionizable chelates, equal to the number of electrical charges of the ionic grouping $$[MQ_t(D_pA)_m];$$

M is titanium, iron, vanadium, aluminum, tin, manganese, chromium, cobalt, copper, zinc, or bismuth; Q is an oxygen or sulphur atom or a lower alkyl or lower alkoxy group: D is an electron doublet donor group selected from the group consisting of carbonyl, carboxyl, amino, imino, amido, hydroxy, and mercapto; A joins together the D radicals and either is a valence bond or a hydrocarbon chain of up to 12 carbon atoms carrying the groups D terminally or at any point on or in the chain, the said chain being linear or branched and unsubstituted or substituted by an aromatic or a cycloaliphatic residue or is a polyvalent cyclic aromatic residue, $p$ is an integer equal to or higher than 2, which is the number of donor groups in the ligand of formula $D_pA$, $s$ is zero or an integer, and $m$ is an integer equal to or higher than 1, $s$ and $m$ being such that $pm + s$ has a value lower than the maximum coordination number of the metal M, and (3) an electron donor in amount at most equal to that required to complex completely the metal of the chelate compound (2), the said electron donor being selected from the group consisting of amines, alcohols, ethers, aldehydes, ketones, imines, oximes, amides, sulphonamides, and phosphonamides, the molar proportions of said components (1) and (2) of the said initiator being each 0.0005 to 5% based on the monomer, the improvement which comprises said polymerization initiator further containing a component (4) a chelate, complex, or salt of a metal of group IB, IIB, IVB, VB, VIB, VIIB, IIA, IIIA, IVA, VA, or VIII of the Periodic Table in which the degree of coordination of the metal is different from the degree of coordination of the metal in the said chelate compound (2), the amount of component (4) being from $10^{-6}$ to $10^{-3}$ molecules per molecule of the said olefinic monomer.

2. A process according to claim 1, in which the chelate, complex or salt (4) is present in an amount from 1/10 to 1/100 of the amount of the chelate compound (2).

3. A process according to claim 1, in which the chelate (4) is cupric, ferric, magnesium, manganic, or chromic acetylacetonate or vanadic benzoyl-acetaldehydate.

4. A process according to claim 1, in which the complex (4) is a complex of a said metal with a monoamine; a monoalcohol, an ether, an aldehyde, an imine, hydroxylamine an oxime, a ketone, an amide, a sulphamide, a tris(dialkylamino)phosphine oxide, or a cyclic diene, $CN^-$, $SCN^-$, a halide ion, $NO_2^-$, $OH^-$ ion, or with water, ammonia, nitric oxide, or carbon monoxide.

5. A process according to claim 1, in which the salt (4) is a copper or iron salt of a saturated or unsaturated aliphatic acid or of a cycloaliphatic or aromatic acid, a halide, nitrate, or sulphate of copper or iron, chromium chloride, nitrate, sulphate or perchlorate, magnesium sulphate or chloride, or stannic chloride.

* * * * *